July 24, 1951  A. O. WILLIAMS  2,561,549
RAIL CAR TRUCK

Filed Feb. 27, 1948  6 Sheets-Sheet 2

INVENTOR.
ALFRED O. WILLIAMS
BY
ATTY.

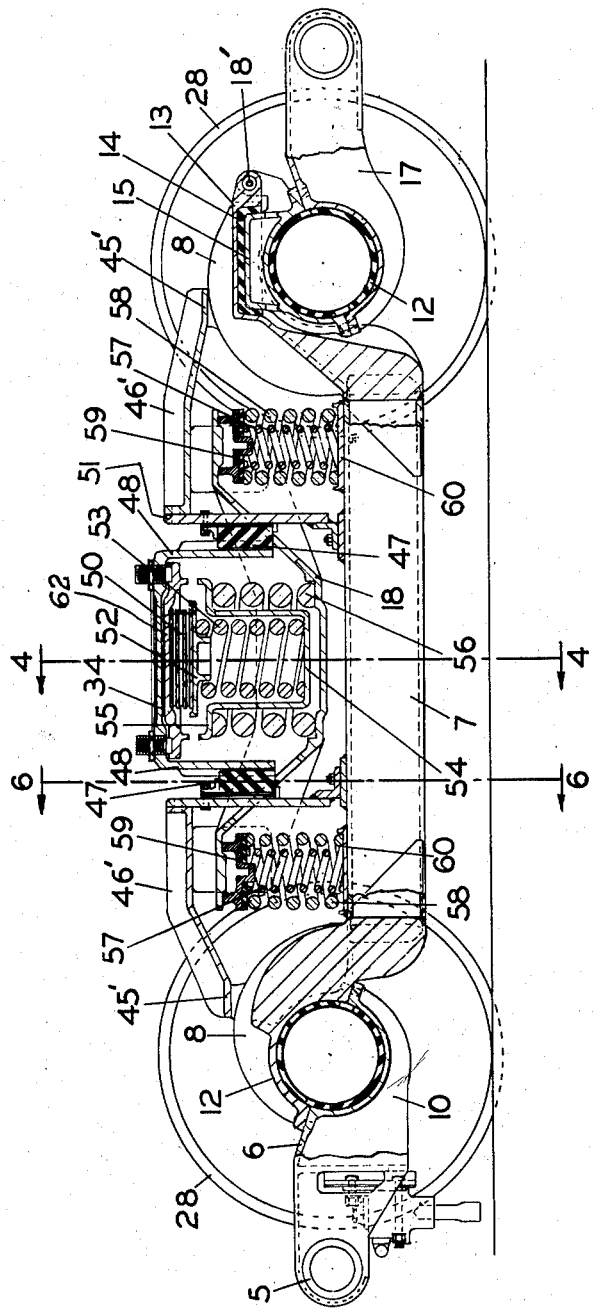

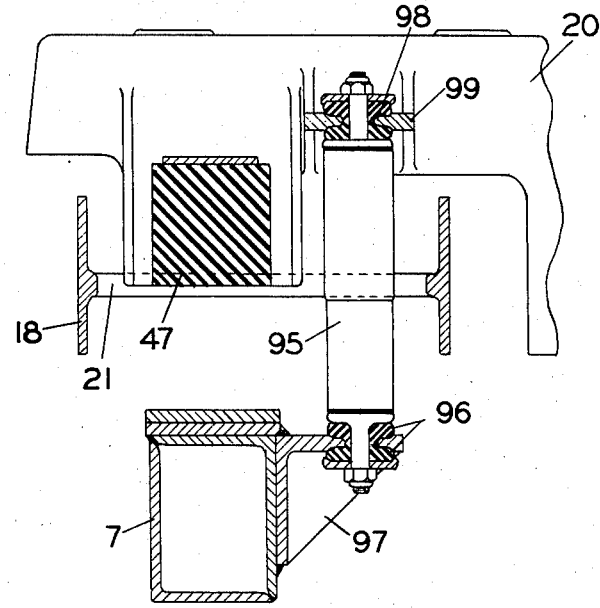
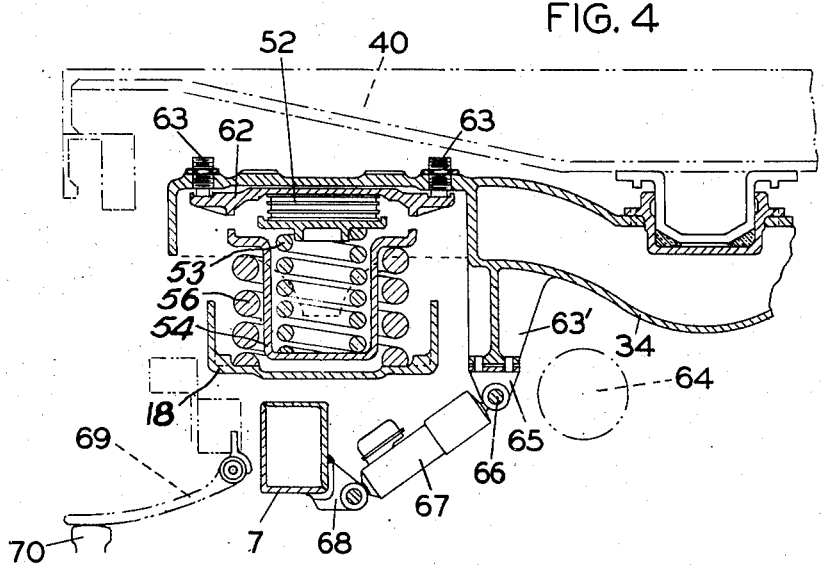

*INVENTOR.*
ALFRED O. WILLIAMS
BY Walter E. Schirmer
ATTY.

July 24, 1951      A. O. WILLIAMS      2,561,549
RAIL CAR TRUCK

Filed Feb. 27, 1948      6 Sheets-Sheet 6

*INVENTOR.*
ALFRED O. WILLIAMS
BY *Walter E. Schismer*
ATTY.

Patented July 24, 1951

2,561,549

UNITED STATES PATENT OFFICE 2,561,549

RAIL CAR TRUCK

Alfred O. Williams, Battle Creek, Mich., assignor to Clark Equipment Company, Buchanan, Mich., a corporation of Michigan Application February 27, 1948, Serial No. 11,411

14 Claims. (Cl. 105—182)

1

This invention relates to rail car trucks and more particularly is concerned with a rail car truck for use on street railways, elevated lines, and subways.

With high speed operation of such vehicles, it is desirable that stability be provided for the axles of the truck to prevent rocking of the vehicle under high speed when track irregularities are encountered. For this reason, the present invention contemplates a truck in which the axles are held in absolute parallelism by a rectangular frame construction which is disposed about the outboard side of the wheels and has elements thereof extending transversely of the truck beyond the wheels.

Another feature of the present invention resides in the manner of transmitting the load from the truck bolster upon which the car body is supported, to the axles of the truck. In the present invention, this is accomplished by providing for transfer of the bolster load to spring elements carried by an intermediate cradle member which, in turn, is resiliently supported upon the side frame or equalizer member which extends between the axle journals.

In one form of the present invention, this loading is accomplished by means of helically coiled spring elements, while in another form of the invention, resilient rubber cushions are provided for transfer of the load.

Another feature of the present invention is the provision of means for absorbing longitudinal forces in the truck during acceleration and deceleration, which forces are transmitted directly from the truck frame through resilient cushioning members to the bolster.

Still another feature of the present invention is the provision of means for allowing, at diagonally opposed points in the truck, relative movement of the axle with respect to the truck frame, whereby vertical irregularities in the track can be negotiated by the truck without imparting twisting and binding stresses to the truck frame.

Other objects and advantages of the present invention will appear more fully from the following detailed description, which, taken in conjunction with the accompanying drawings, will disclose to those skilled in the art, the particular construction and operation of preferred forms of the present invention.

In the drawings:

Figure 3 is a view corresponding to Figure 2, of a modified truck construction and illustrates a different type of spring suspension.

Figure 4 is a vertical sectional view taken substantially on line 4—4 of Figure 3.

Figure 2:
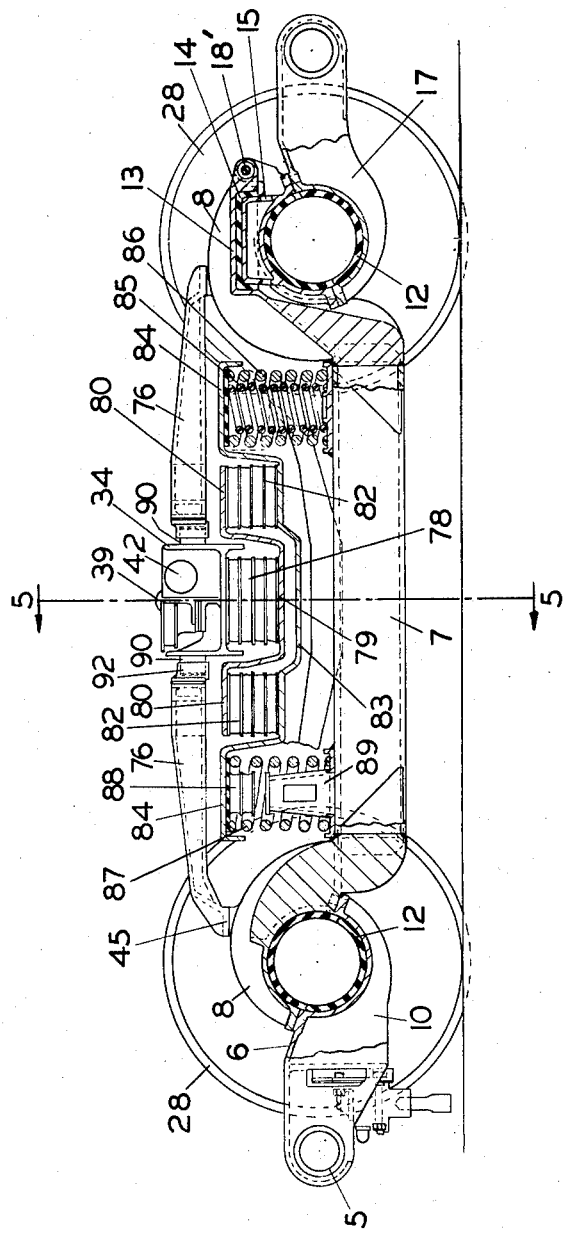
Figure 2 is a side elevational view partly in section, of the truck shown in Figure 1.

2 in section, taken substantially on line 5—5 of Figure 2.

Figure 1:
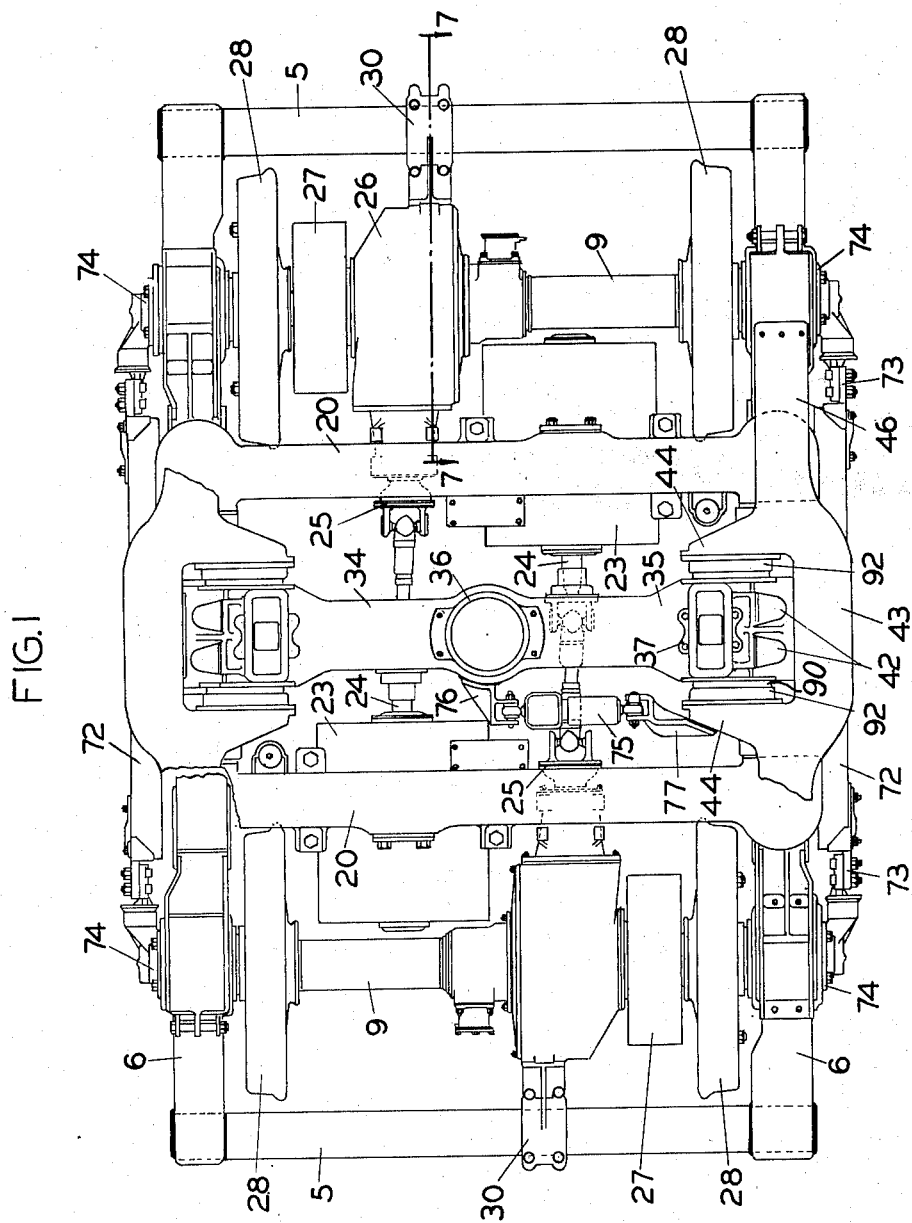
Figure 1 is a top plan view of a truck construction embodying the present invention.
Figure 7:
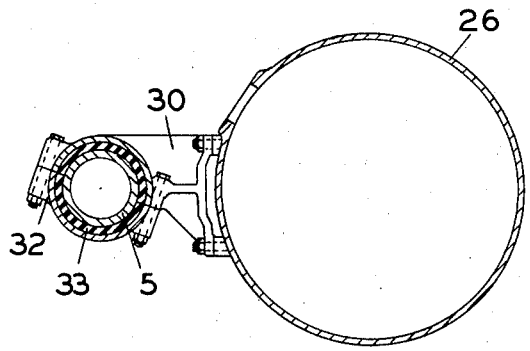

Figure 6 is a sectional view substantially on line 6—6 of Figure 3;

Figure 7 is a sectional view taken on line 7—7 of Figure 1; and

Figure 9:
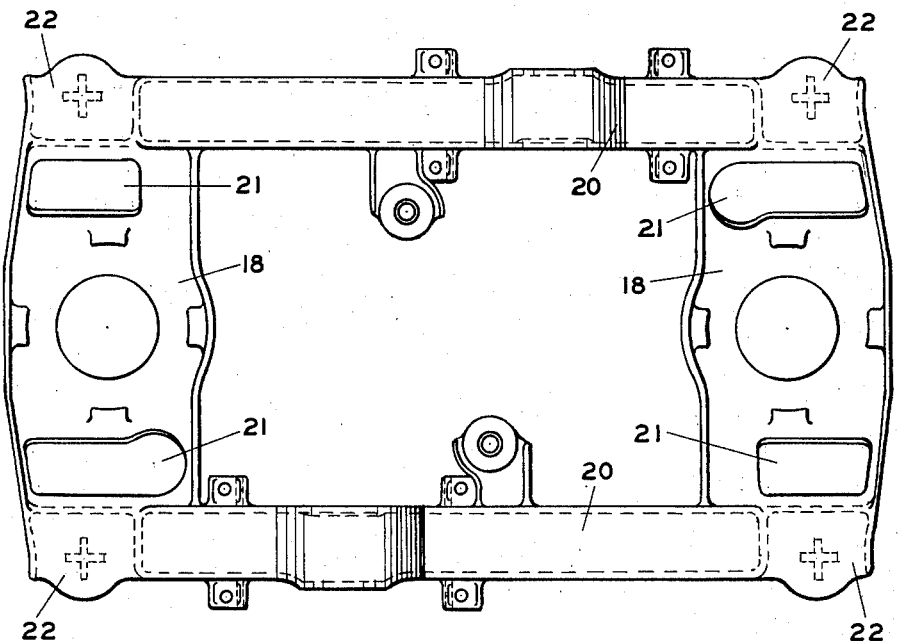
Figure 8:
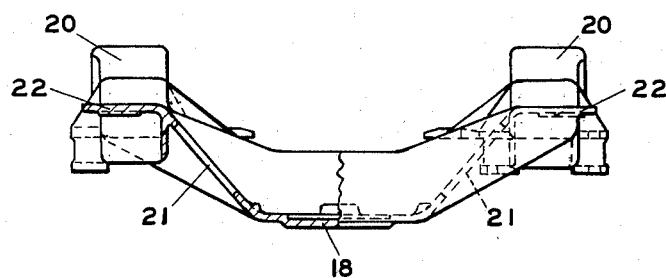

Figure 8 is an end elevational view partly in section, of the cradle member and sub-frame shown in Figures 1 and 3; and Figure 9 is a top elevational view of the sub-frame member shown in Figure 8.

Referring now in detail to the drawings, and particularly the embodiments of the invention shown in Figures 1, 2, 5 and 7, inclusive, there is provided a truck having a rectangular frame construction consisting of two transverse end elements 5, preferably in the form of tubular cross members which are secured in the extending ends of the side frame members 6 as by welding or the like. Each of the side frame members 6 comprises a substantially tubular dropped central portion 7, having arched end portions 8, extending over the projecting shafts which extend out of the axle housing, indicated generally at 9.

These arched portions 8, at one end of the side frame member, are adapted to be clamped directly to the corresponding end portion 10 of the side frame element about the axle ends, there being a rubber bushing or sleeve member 12 disposed therebetween, thereby providing a relatively rigid member, which, while cushioning the bearing assembly within the journal, prevents any rocking action of the axle relative to the frame.

At the opposite end of the side frame member 7, the arched portion 8, thereof, terminates in an inverted basket shaped portion 13, which receives an inverted cup shaped rubber cushioning element 14, seated over an extending boss 15, formed as half of an axle supporting bracket, and is thereby resiliently supported thereon in such manner as to provide a resilient and flexible joint in the truck frame at this point which will accommodate vertical movement of one end of the axle.

The member 15 is secured to an extension member 17, projecting forwardly of the truck, with rubber bushings or sleeve members, such as indicated at 12, being interposed between the annular surface of the axle bearing and the members 15 and 17. As a result with this construction, a yieldable joint in the truck frame is provided, located over one end of one of the axles, to accommodate vertical movement of this axle end.

A safety pin 18' is provided at the end which is capable of rocking to prevent any displacement or separation of the arched portion 8 relative the bracket member 15. Conversely, on the opposite side of the truck, the side frame member 7 has the construction reversed relative the axle housings, whereby the truck frame consisting of the side frame members 7 and the cross frame members 5 provides for diagonally opposed means for holding the axles against angular movement relative to the frame, and at the opposed diagonal points, provides for limited angular movement of the axles relative to the frame.

Extending between the two side frame members 7 transversely of the truck is a substantially rectangular sub-frame member, including the transverse cross frames 20, which, at their ends, are interconnected by a depending normally extending end member 83, having cap portions 84, forming a depending cradle element. Intermediate their ends, the members 20 have opposed arcuate portions for receiving the electric motors 23, which are bolted thereto, these motors having extending shaft portions 24 connected through suitable universal joints to the ends of pinion shafts 25, which project into the gear housings 26, containing the ring and pinion gears by which the axle shafts within the housings 9 are driven. Suitable brake mechanisms, indicated generally at 27, are provided for each of the axle shafts, and the wheels for such shafts are mounted at the ends of the axles inwardly of the journals for the shafts and on the inboard side of the side frame members 7, the wheels being indicated at 28.

Suitable journals are provided at the extending ends of the shafts, the outer shell of these journals being received within the rubber sleeves 12, upon which the side frame members are supported, such journal assemblies being indicated generally at 74 in Figure 1.

To support the gear housings on the axles 9 against torque reactions caused by acceleration or braking, the gear housing portions 26 thereof have extending brackets 30 bolted or otherwise suitably secured thereto, which are adapted to receive cap members 32, encircling the transverse cross members 5. Suitable rubber sleeves or bushings 32 are disposed between the journal and the cross shaft 5, whereby the housing is resiliently cushioned against torque reactions by connection to the cross members.

The car body of the vehicle is supported through a center plate mounted upon a transversely extending bolster member, indicated generally at 34 in Figure 1, which bolster has enlarged end portions 35. The bolster, intermediate the central king pin portion 36 and the end portion 35 is provided with a raised bracket portion 37, as shown clearly in Figure 5, upon which is mounted a roller supporting member 38, carrying the roller 39, located beneath the transverse frame 40 of the car body, indicated in dotted lines in Figure 5, to limit the lateral rocking movement of the car body relative the bolster.

Immediately adjacent the outboard side of the roller 39, there is provided a vertical flange portion 41, carrying a rubber bumper element 42, adapted upon transverse oscillation of the bolster, to abut against the portion 43 of a reaction member, indicated generally at 46, this member extending above the frame member 7, and having inwardly extending opposed arm portions 44 and being secured to the top of the arched portions 8 of the side frame member, as indicated at 45 in Figure 2.

Suitable rubber cushioning elements, indicated at 90 in Figure 2, and bearing against the sides of the bolster ends 35, are adapted to be held within recessed bosses 92, carried by the opposed arms 44 for cushioning the bolster against movement in the longitudinal plane of the truck. Each end of the bolster is thus arranged for cushioned support in a longitudinal direction between the extending arms 44 of the member 43.

Secured to the under surface of the bolster end 35 as shown in Figure 2, is a plurality of vertically arranged spring elements consisting of rubber elements or cushions, carried between thin metal plates to which opposite sides of the cushions are vulcanized and indicated as a unit by the reference numeral 78, which unit is adapted to rest upon a base portion 79 of a generally U-shaped cradle member, having its opposite ends formed into extending cap portions 80, extending fore and aft of the vehicle above the side frame member 7. The cap portions 80 of this cradle member, in turn, are adapted to be supported through a corresponding plurality of rubber cushioning elements 82, which, in turn, are supported upon suitably flatted portions of the cradle portion 83 of the sub-frame assembly 20.

Thus, it will be apparent that the vertical load upon the bolster 34 is transmitted through the cushioning unit 78, to the cradle 79, and thence through the cushioning units 82, to the cradle 83. From this point, the load is transmitted through the cap portions 84 of the members 20 into a double coiled spring element 85—86, shown at the right hand side of Figure 2, or as an optional arrangement, a heavy coil spring element 87 and rubber cushioning element 88, adapted to bottom upon a pedestal 89, carried on the side frame member 7, as shown at the left hand side of Figure 2. In either event, the spring elements 85—86 or 87—88 are disposed at and seated against the end portions of the transverse member 20, directly below the extending arm portions 76 of the member 43, and the load from the bolster is thereby transmitted to the side frame members 7 and thence to the axles.

Figure 5:
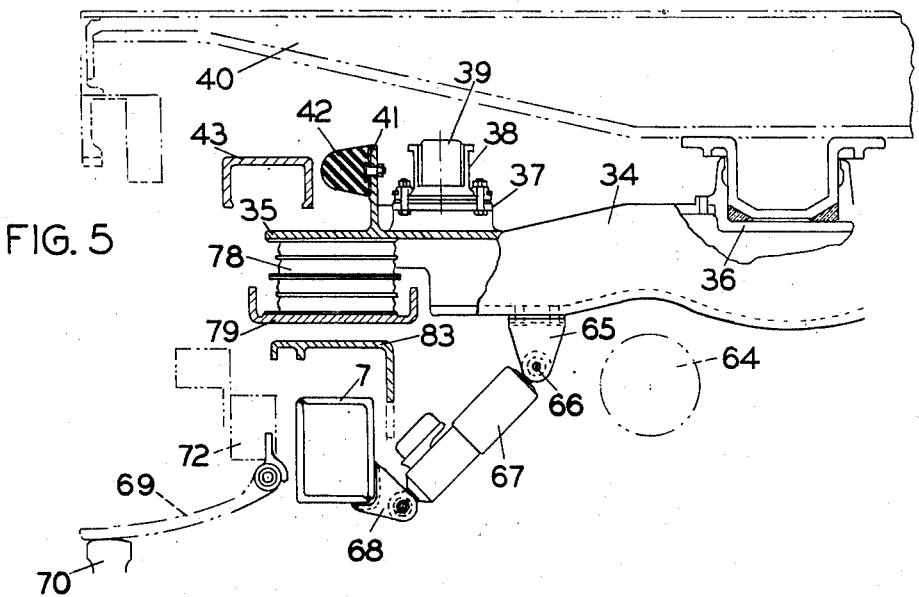
Figure 5 is a corresponding vertical view, partly

Considering again Figure 5, it will be noted that the side frame member 7, which is generally rectangular in section, is provided with a bracket portion 68, adapted to pivotally support one end of a shock absorbing member 67, extending diagonally therefrom to a bracket 65, carried by and supported from the bolster 34, and forming a support for the pivotal mounting 66 of the other end of the shock absorber 67. It will thus be seen that this shock absorbing arrangement is disposed adjacent to but out of the way of the center line of the propeller shaft, indicated at 64.

The side frame member 7 is also arranged to provide a support at its journal mountings upon the axle shaft, for an outwardly extending track contact shoe 69, adapted to engage the third rail or power rail 70, of the electric system for the vehicle. The shoe 69 is adapted to be carried upon a beam member 72, shown in Figures 1 and 5, which beam member is provided with connecting brackets at each of its ends, as at 73, adapted to be connected to and supported upon the end closure plate 74, enclosing the journal bearings for the shafts, which are journalled within the side frame members 7 and extend outwardly from the wheels 28.

There is also provided a horizontally arranged shock absorbing member comprising the member 75, which at its opposite ends is pivotally mounted through suitable rubber bushings to a bracket 76' carried adjacent to the center of the bolster 34, and a second bracket 77 secured to one of the arms 44 of the reaction member 43.

In the truck construction shown in Figures 3, 4, and 6, the general arrangement for support of the bolster upon the truck frame and transmission of its loads to the side frame members is modified somewhat, but in general, the same principles are provided, and in most cases, similar reference numerals are employed to designate corresponding parts. The side frame construction is essentially the same as that previously described and consequently, it is not believed that it requires additional description.

However, in this case, the bolster 34, as shown particularly in Figures 3 and 4, is of somewhat different construction, and is provided at its end with an equalizer adjustment for the transmission of vertical loads, comprising an equalizer plate 62, having adjustment screws 63 for positioning the plate to raise the bolster for accommodating wheel wear.

In this form of the invention, the bolster also is provided with depending side flanges 48, shown in Figure 3, which are adapted to abut against suitable rubber cushioning elements 47, carried by plate elements 51, which extend vertically from the top surface of the side frame member up to the inner ends of reaction arms 46', supported at their ends upon the top of the arched portions 8 of the side frame members, as indicated at 45'. These plate members are thus rigidly secured in vertical position and support the rubber bumpers 47 for restraining longitudinal movement of the bolster 34.

The transverse members 20, in this form of the invention, are substantially the same as those described in connection with Figures 1 and 2, but as shown in more detail in Figures 8 and 9 terminate at their ends in cross connecting downwardly depending cradle elements 18, which are substantially T-shaped in section, and which are provided with openings therethrough, indicated at 21, through which extends the plate elements 51 and the rubber bumpers 47.

The spring suspension shown in Figure 3, differs from that described in connection with Figure 2 in that the equalizer plate 62 is adapted to carry a rubber cushioning element 50, composed of a series of thin metal plates with rubber discs spaced therebetween bearing against the top spring plate 52, which has a central boss portion about which is seated the upper end of the inner helically coiled spring 53. The lower end of this spring is seated in the base portion of a cup shaped element 54, having an annularly flanged lip 55, which, in turn, forms a seat for the upper end of a relatively heavy coiled spring 56, which, in turn, has its lower end biased in a suitable spring receiving base portion formed intermediate the ends of the cradle connecting elements 18.

Thus it is apparent that vertical loads from the bolster are transmitted through rubber cushioning elements and thence through the double spring elements 53 and 56 to the sub-frame, composed of the members 20 and the cradle 18. At the junction between the connecting ends of the cradle 18 and the members 20, indicated at 22 in Figures 8 and 9 there is provided a double coil spring suspension consisting of inner helically coiled springs 57 and outer helically coiled springs 58. These springs at their upper ends, are seated against a cap member 59, and at their lower end are retained upon spring seats 60, carried on the side frame member 7.

Preferably, a suitable rubber cushioning element is disposed between the cap member 59 and the springs to provide a sound deadening resilient cushion therebetween. Thus it will be seen that there is no metallic connection between the side frame members and the intermediate cradle 18, and the resilient discs 50 eliminate metallic connection between the bolster and the first series of springs 53—56.

It will thus be apparent that vertical loads from the bolster are transmitted through a first cushioning element to a cradle member and thence from the cradle member to secondary cushioning elements to the side frame members, thus corresponding to the type of spring suspension described in detail in connection with Figure 2, although it will be apparent that in Figure 2, the space between these respective series of springs is extended somewhat due to the design of the spring construction.

Considering again Figure 4, it will be noted that the truck construction of Figure 2 also includes the track shoe 69 as described in connection with Figure 5 and a shock absorber 67 supported in substantially the same manner by the bracket 65 in this instance is carried upon a depending bracket 63', formed integral with the bolster 34 due to the shape of the bolster differing from that shown in Figures 2 and 5.

In Figure 6 a modified type of shock absorber mechanism is provided in which the shock absorber 95 extends vertically between the cross frame member 20 and the side frame member 7. At its lower end the member 95 is supported through rubber cushioning elements 96, upon a bracket 97, welded to the inboard side of this side frame member 7, and extends vertically upwardly through the opening 21 in the cradle member 18 to an integral bracket portion 99, carried by the cross member 20, there being suitable rubber cushions 98 interposed in this connection.

With the use of a vertical shock absorber such as shown at 95 in Figure 6, it may also be necessary to provide the transverse shock absorber such as shown at 75 in Figure 1. However, with the diagonally arranged shock absorber 67 of Figures 4 and 5, two such opposed diagonally arranged shock absorbers are capable of effectively providing both vertical and lateral shock reaction.

It is therefore believed that I have provided a rail truck of the class described, in which the axles are supported against movement out of parallel relationship by a rectangular frame member disposed about the outboard sides thereof, which frame member, however, at diagonally opposed points, provides for limited rocking action to accommodate the truck to track irregularities, without imposing any appreciable stress on the truck frame. Similarly, the present construction also provides for absorbing the reaction between the frame and the axle housing, inasmuch as the corresponding members of the frame can thus form the anchor for the axle housing.

It is also apparent that the present invention provides novel means for suspending the bolster in the truck frame and for cushioning it against both lateral and endwise movement. While the invention shows two means by which the load upon the truck bolster can be transmitted to the truck frame, it is, of course, understood that this particular phase of the present invention is not to be limited to only such type of suspension, and I therefore do not intend to limit the present invention, except as defined by the scope and spirit of the appended claims. The principles of the present invention have been additionally embodied in another rail car truck of my invention and for a detail description of such truck, reference may be had to my co-pending application, Serial No. 37,926, filed July 9, 1948.

I claim:

1. A rail car truck comprising a main frame having longitudinally extending side frame members, a substantially rectangular sub-frame extending transversely of said main frame, resilient means for supporting the corner portions of said sub-frame on said side frame members, said sub-frame having cradle portions formed integrally therewith at the ends thereof overlying said side frame members, said cradle portions lying below a horizontal plane passing through the tops of the resilient means supporting the corner portions of said sub-frame, a bolster extending transversely of said main frame, resilient means supporting the ends of said bolster on said cradle portions, and said last named resilient means lying substantially vertically co-extensive with said resilient means supporting the corner portions of said sub-frame.

2. The truck of claim 1, including diagonally extending shock absorbing means between said side members and said bolster.

3. The truck of claim 1 including rigid arms on said side members of the main frame on opposite sides of the ends of the bolster, and rubber means intermediate said arms and bolster sides to cushion and limit lateral movement of said bolster lengthwise of the main frame.

4. The truck of claim 1 including bumper means reacting between the ends of said bolster and said side members of the main frame to control longitudinal movement of said bolster transversely of the main frame.

5. The truck of claim 1 including shock absorbing means between said bolster and said main frame.

6. The truck of claim 1 including shock absorbing means between said sub-frame and the side members of said main frame.

7. In a rail car truck including a main frame having longitudinally extending side frame members, a sub-frame extending transversely of said main frame, a bolster extending transversely of said main frame and overlying said sub-frame centrally thereof, the combination of resilient means spaced on said side frame members and supporting the corners of said sub-frame on said side frame members, supporting means for said bolster arranged between said bolster and the end portions of said sub-frame overlying said side frame members, said supporting means comprising a first stack of rubber discs, an intermediate load transferring member supporting said discs at the center thereof, and a plurality of stacks of rubber discs supporting said load transferring member on the end portions of said sub-frame.

8. In a rail truck having a rectangular main frame with longitudinally extending side frame members provided with depressed central portions, a transverse sub-frame having its corners resiliently supported on said side frame members and having depressed end cradle portions overlying said longitudinally extending side frame members, a transverse bolster within said sub-frame, resilient means on said main frame cushioning said bolster ends against lateral and longitudinal oscillation, and resilient means on said cradle portions supporting the vertical loading of said bolster.

9. The truck of claim 8 wherein said last-named resilient means includes spaced resilient members supported on said cradle portion, intermediate load transfer members supported at their ends on said resilient members and secondary resilient means at the center of said transfer members vertically supporting the ends of said bolster.

10. The truck of claim 8 wherein said main frame includes rigid spaced apart arm portions forming inboard opening U-shaped recesses for receiving the ends of said bolster, resilient means mounted in facing relation to said rigid arm portions and adapted to engage the sides of said bolster for cushioning lateral movement of said bolster lengthwise of said main frame.

11. In a rail truck having a main rectangular frame with centrally depressed side frame members, a rectangular sub-frame extending transversely across said main frame, resilient means supported on the depressed portion of said main frame and supporting the corners of said sub-frame, a transverse bolster within said sub-frame and resiliently supported thereon, rigid arm means on said side frame members receiving the ends of said bolster and rubber cushioning means carried by said arm means between said bolster ends and said arm means for absorbing longitudinal reactions of said bolster.

12. The rail car truck of claim 7 wherein said resilient means supporting the corners of said sub-frame includes double helically coiled spring elements.

13. A rail car truck comprising a main frame having longitudinally extending side frame members provided with depressed center portions intermediate the ends thereof, a substantially rectangular sub-frame extending transversely of said main frame, first resilient means disposed between the corners of said sub-frame and the depressed center portions of said side frame members for supporting said sub-frame vertically on said main frame, a bolster extending transversely of said main frame, said sub-frame having cradle portions formed integrally therewith at the ends thereof disposed above the depressed center portions of said side frame members, said cradle portions lying below a horizontal plane passing through the tops of said first resilient means, resilient supporting means between the ends of said bolster and the cradle portions of said sub-frame intermediate of said first resilient means between said sub-frame and said last named resilient means lying substantially vertically co-extensive with said first resilient means and said main frame.

14. The rail car truck of claim 13 wherein said last named resilient supporting means comprises a first coil spring cooperating with said bolster, a cup-shaped element supporting said coil spring in the depression formed therein, and said cup-shaped element being disposed within a second coil spring carried in the cradle portion of said sub-frame.

ALFRED O. WILLIAMS.

REFERENCES CITED

The following references are of record in the file of this patent:

UNITED STATES PATENTS

| Number | Name | Date |
|---|---|---|
| 1,640,180 | Buckwalter | Aug. 23, 1927 |
| 2,184,102 | Piron | Dec. 19, 1939 |
| 2,231,195 | Piron | Feb. 11, 1941 |
| 2,277,606 | Pflager | Mar. 24, 1942 |
| 2,298,286 | Frede | Oct. 13, 1942 |
| 2,316,046 | Buckwalter | Apr. 6, 1943 |
| 2,347,500 | Parke | Apr. 25, 1944 |
| 2,394,547 | Hickman | Feb. 12, 1946 |